(12) United States Patent
Küspert et al.

(10) Patent No.: US 7,934,379 B2
(45) Date of Patent: May 3, 2011

(54) INTERNAL COMBUSTION ENGINE COMPRISING AN EXHAUST GAS TURBOCHARGER

(75) Inventors: Alfred Küspert, Ostfildern (DE); Wolfram Schmid, Nürtingen (DE); Siegfried Sumser, Stuttgart (DE)

(73) Assignee: Daimler AG, Stuttgart (DE)

(*) Notice: Subject to any disclaimer, the term of this patent is extended or adjusted under 35 U.S.C. 154(b) by 1150 days.

(21) Appl. No.: 11/651,405

(22) Filed: Jan. 9, 2007

(65) Prior Publication Data
US 2010/0229550 A1  Sep. 16, 2010

Related U.S. Application Data

(63) Continuation-in-part of application No. PCT/EP2005/006834, filed on Jun. 24, 2005.

(30) Foreign Application Priority Data

Jul. 15, 2004 (DE) .......................... 10 2004 034 070

(51) Int. Cl.
*F02D 23/00* (2006.01)
(52) U.S. Cl. ...................... 60/602; 123/559.2
(58) Field of Classification Search .............. 60/598–612
See application file for complete search history.

(56) References Cited

U.S. PATENT DOCUMENTS

| | | | | |
|---|---|---|---|---|
| 4,224,794 A | * | 9/1980 | Woollenweber | 60/602 |
| 6,220,032 B1 | * | 4/2001 | Schmidt et al. | 60/602 |
| 6,256,991 B1 | * | 7/2001 | Schmidt et al. | 60/602 |
| 6,269,643 B1 | * | 8/2001 | Schmidt et al. | 60/602 |

FOREIGN PATENT DOCUMENTS

| | | |
|---|---|---|
| DE | 43 30 487 C1 | 1/1995 |
| DE | 197 27 141 C1 | 8/1998 |
| DE | 197 27 140 C1 | 12/1998 |
| DE | 198 53 360 A1 | 5/2000 |
| DE | 101 52 804 A1 | 5/2003 |
| WO | WO 99/00590 | 1/1999 |

* cited by examiner

*Primary Examiner* — Thomas Denion
*Assistant Examiner* — Douglas J. Duff
(74) *Attorney, Agent, or Firm* — Klaus J. Bach

(57) ABSTRACT

In an internal combustion engine comprising an exhaust gas turbocharger, including a turbine with at least two inlet passages arranged in the exhaust gas tract of the internal combustion engine, via which exhaust gas from the internal combustion engine can be supplied to a turbine wheel of the turbine, and a valve arrangement being arranged in to the exhaust gas tract to the turbocharger to control the supply of exhaust gas to the inlet passages of the turbine, a valve and turbine inlet passage configuration is selectable providing for a maximum braking power with low thermal load.

16 Claims, 6 Drawing Sheets

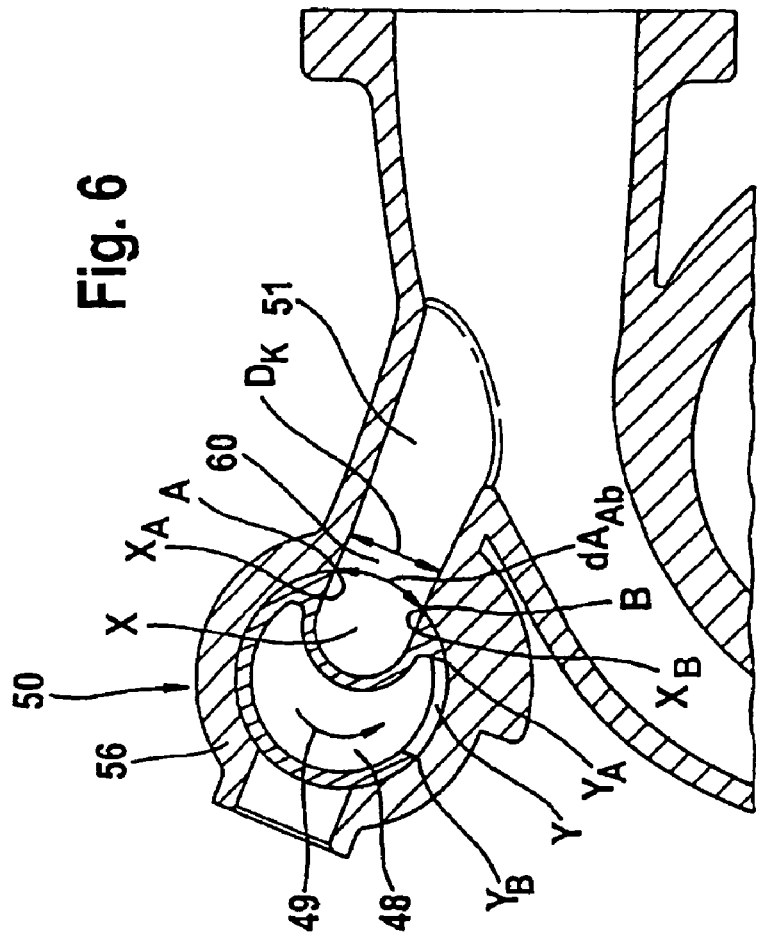
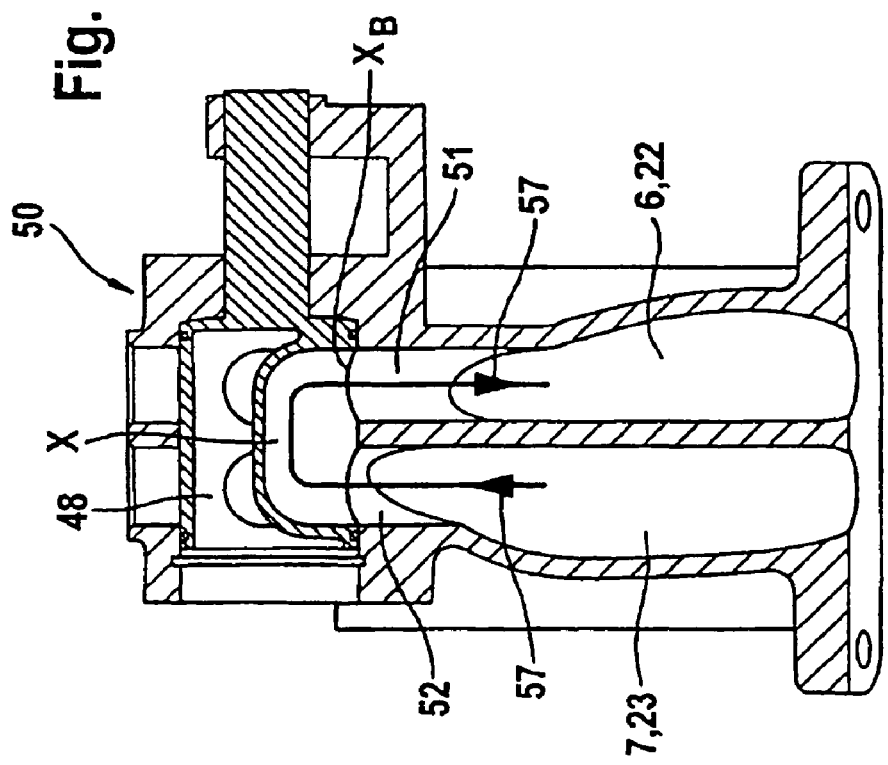
Fig. 5
Fig. 6

INTERNAL COMBUSTION ENGINE COMPRISING AN EXHAUST GAS TURBOCHARGER

This is a Continuation-In-Part Application of pending international patent application PCT/EP2005/006834 filed Jun. 24, 2005 and claiming the priority of German patent application 10 2004 034 070.6 filed Jul. 15, 2004.

BACKGROUND OF THE INVENTION

The invention relates to an internal combustion engine with a variable volume combustion chamber and comprising an exhaust gas turbocharger with a turbine wheel of a design capable of generating a high engine braking torque with relatively low thermal loads.

The publication on which the preamble is based, DE 101 52 804 A1, describes an internal combustion engine whose exhaust gas turbocharger has a two-inlet passage turbine with an asymmetric turbine housing. The two inlet passages of the turbine are dimensioned such that the emission of pollutants and the fuel consumption of the internal combustion engine are reduced, giving the internal combustion engine a good exhaust emission behavior.

A precondition for the good exhaust emission behavior of the internal combustion engine is a different dimensioning of the two inlet passages, so that the turbine has one inlet passage with a larger effective annular nozzle structure and hence a larger flow cross section, and one inlet passage with a smaller effective annular nozzle structure and hence a smaller flow cross section.

As a result of the different dimensioning of the inlet passages of the turbine, the exhaust gas turbocharger can be employed for an engine braking mode of the internal combustion engine in such a way that when the exhaust gas turbo-charger is used as an engine brake, the inlet passage with the smaller effective annular nozzle is used to back up the air.

It is the object of the present invention to provide an internal combustion engine with an exhaust gas turbocharger which can generate the high braking powers needed for the engine braking mode in a suitable relationship to the speed of the engine predominantly required for the motoring mode with relatively low thermal loads.

SUMMARY OF THE INVENTION

In an internal combustion engine comprising an exhaust gas turbocharger including a turbine with at least two inlet passages arranged in the exhaust gas tract of the internal combustion engine, via which exhaust gas from the internal combustion engine can be supplied to a turbine wheel of the turbine, and a valve structure being arranged in the exhaust gas tract to the turbocharger to control the supply of exhaust gases to the inlet passages of the turbine, a valve structure and turbine inlet passage configuration is provided which is adjustable for the generation of maximum braking power with low thermal load.

The invention is based on the concept of providing geometric dimensions of the internal combustion engine and of the exhaust gas turbocharger in a particular relationship to one another such that the maximum braking power in an engine braking mode can be achieved with optimum dimensioning of the internal combustion engine and the exhaust gas turbo-charger.

The turbine with asymmetric housing and dimensioning according to the invention is capable of almost doubling the braking power over what has been achieved to date during operation of the internal combustion engine with a normal brake valve.

An inlet diameter of a turbine wheel $D_T$, a total piston displacement $V_H$ of the internal combustion engine formed from a differential volume between maximum piston displacement and minimum piston displacement of the internal combustion engine, a smallest flow cross section $A_{D,small}$ and a variable opening cross section $dA_{Ab,max}$ are set in relation to one another in such a way that a turbocharger braking factor $TBF_{Asym}$ for an asymmetric turbine housing is obtained according to the equation $$TBF_{Asym} = (A_{D,small} + dA_{Ab,max}) \cdot \frac{D_T}{V_H}.$$

According to the invention, the turbocharger braking factor $TBF_{Asym}$, is smaller than 0.005 and preferably lies between 0.001 and 0.003.

Also, the smallest flow cross-section at maximum braking power is $A_{D,small}=A_D$, with the neck cross-section $A_1$ being larger than smaller annular nozzle structure flow cross-section.

In an advantageous embodiment, the turbocharger braking factor $TBF_{Asym}$ is preferably 0.002.

The smallest effective annular nozzle flow cross section represents here the smallest flow cross section to the turbine wheel and is thus relevant for the maximum backup pressure upstream of the turbine wheel, and hence for the maximum braking power.

In a further embodiment, the smallest flow cross section $A_{D,small}$ defined by the maximum braking power is the neck cross section $A_1$, with the neck cross section $A_1$ being smaller than the smallest annular nozzle cross section $A_{D,1}$. The neck cross section $A_1$ represents here the smallest flow cross section to the turbine wheel and is thus relevant for the maximum backup pressure upstream of the turbine wheel, and hence for the maximum braking power.

In a further advantageous embodiment, a ratio of the maximum variable opening cross section $dA_{Ab,max}$ to the smallest flow cross section $A_{D,small}$ at maximum braking power within the scope of the invention is larger than 0.2 and preferably lies in the range between 0.2 and 1. With a small ratio, the braking power in the lower engine speed range is comparatively small and increases relatively strongly in the upper engine speed range. A large ratio can generate a higher braking power even in the lower engine speed range with a—by comparison with smaller ratios—flatter increase in the braking power up to the point of maximum braking power as design point.

In a further advantageous embodiment, the maximum variable opening cross section $dA_{Ab,max}$ of the valve arrangement at maximum braking power is the upper limit value that the variable opening cross section $dA_{Ab}$ of the valve arrangement can assume, as a further increase in the opening cross section does not result in any flow-relevant advantage.

In a further preferred embodiment, the value of the maximum variable opening cross section $dA_{Ab,max}$ of the valve arrangement is to be limited to not more than the same value of a largest annular nozzle flow cross-section, as the largest inlet flow passage of the asymmetric turbine housing is relevant for the diversion and the narrowest cross-section of the largest inlet passage is the largest annular nozzle flow cross-section.

In a further advantageous embodiment, the variable opening cross section $dA_{Ab}$ of the valve arrangement can be varied according to the engine speed, as the exhaust gas volume to be diverted is dependent on the engine speed.

In a further advantageous embodiment, the variable opening cross section $dA_{Ab}$ of the valve arrangement decreases with falling engine speed, as the exhaust gas volume to be diverted decreases in value with falling engine speed and increases in value with increasing engine speed.

In a further advantageous embodiment, the range of the partially or completely open opening cross section of the valve arrangement based on the speed band of the engine is assigned to an upper range of the speed band of the engine that extends at least up to the engine speed at maximum braking power in order to achieve a maximum braking power by means of the maximum possible exhaust gas volume to be diverted.

In a further advantageous embodiment, the maximum braking power lies at an engine speed that is higher than the rated speed of the internal combustion engine.

In a further advantageous embodiment, the engine speed range in which the opening cross section of the valve arrangement is uncovered expediently begins at roughly ⅔ to ¾ of the engine speed at maximum braking power.

In a further advantageous, the engine speed at which the maximum braking power is achieved lies in a range that is roughly ¼ to ⅓ larger than the rated engine speed of the internal combustion engine.

In a further advantageous embodiment, the inlet passages of the turbine of the internal combustion engine are related to one another according to an asymmetry factor $F_{Asym}$ formed by a relationship between the turbine throughput parameters, whereby the turbine throughput parameters in the range of a choke line of, the turbine have to be determined from an exhaust gas mass flow, an exhaust gas temperature and an exhaust gas pressure, each measured in the respective inlet passage. According to the invention, this asymmetry factor must not exceed the reciprocal of the piston displacement of the internal combustion engine, exponentiated with the value 0.15.

In a preferred embodiment, the valve arrangement is designed as a rotary disk valve.

In still a further advantageous embodiment, the valve arrangement has both a diversion opening and a blow-off opening so that a diversion of exhaust gas from one inlet passage to the other inlet passage and a blow-off of exhaust gas past the turbine can be performed with one device. This embodiment also permits a simultaneous diversion and blow-off of exhaust gas in order to limit exhaust gas turbo-charger speeds.

In a further advantageous embodiment, the blow-off opening is formed as a flat slot.

In a further advantageous embodiment, the valve arrangement represents a blow-off device with a blow-off opening, since with very high braking powers, e.g. with turbo-charger braking factors smaller than 0.003, a limitation of an exhaust gas turbocharger speed is necessary. A blow-off device that guides the exhaust gas past the turbine represents a simple solution for limiting the exhaust gas turbo-charger speed.

In a further advantageous embodiment, the valve arrangement represents a diversion device. This allows exhaust gas to be diverted from a larger inlet flow passage into a smaller inlet flow passage so that the exhaust gas in the smaller inlet flow passage is compressed to a higher pressure. With certain designs and operating points, diversion directions from the smaller inlet passage to the larger inlet passage are conceivable. The exhaust gas meets the turbine wheel at a higher pressure. This results in an increase in the exhaust gas turbocharger speed, and hence to an increase in the air volume delivered by a compressor of the exhaust gas turbocharger. The increase in the demanded air volume results in an increase in the engine braking power.

Further advantages and expedient embodiments of the invention will become more readily apparent from the following description of the invention on the basis of the accompanying drawings:

BRIEF DESCRIPTION OF THE DRAWINGS

FIG. 5 shows a cross section through the turbine with two inlet passages and through the valve arrangement according to FIG. 2 in an open valve position in which a diversion of exhaust gas from the larger inlet passage to the smaller inlet passage takes place, FIG. 6 shows a further cross section through the valve arrangement according to FIG. 5.

DESCRIPTION OF PREFERRED EMBODIMENTS

Figure 1:
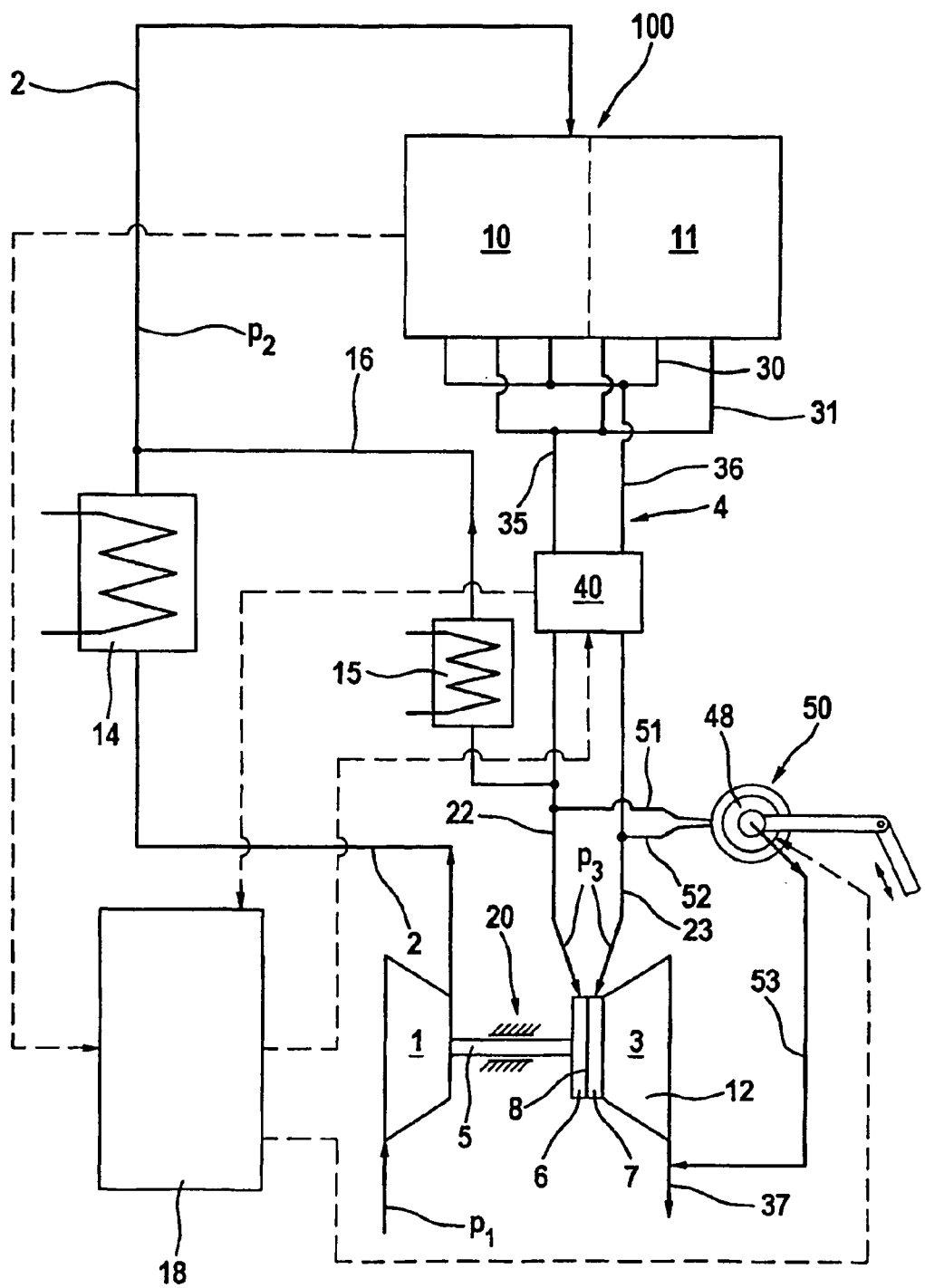
FIG. 1 shows a diagrammatic representation of an internal combustion engine with an exhaust gas turbocharger according to the invention.

FIG. 1 shows an internal combustion engine 100 according to the invention with an exhaust gas turbocharger 20. The internal combustion engine 100 is, for example, a diesel engine for a motor vehicle, but can also be a spark-ignition engine for a motor vehicle. The exhaust gas turbocharger 20 with a compressor 1 in an intake tract 2 of the internal combustion engine 100 and a turbine 3 in an exhaust gas tract 4 of the internal combustion engine 100 is assigned to the internal combustion engine 100. The turbine 3 is, for example, a turbine with fixed inlet flow passage, but can also be a turbine with a variable turbine vane structure (VTG). The compressor 1 is driven by means of a shaft 5 by the turbine 3 so that the compressor 2 draws in fresh air with a pressure $p_1$ and compresses it to a charge pressure $p_2$. The compressor 1 has a fixed vane structure, but it can also be a compressor with a variable compressor vane structure.

Figure 2:
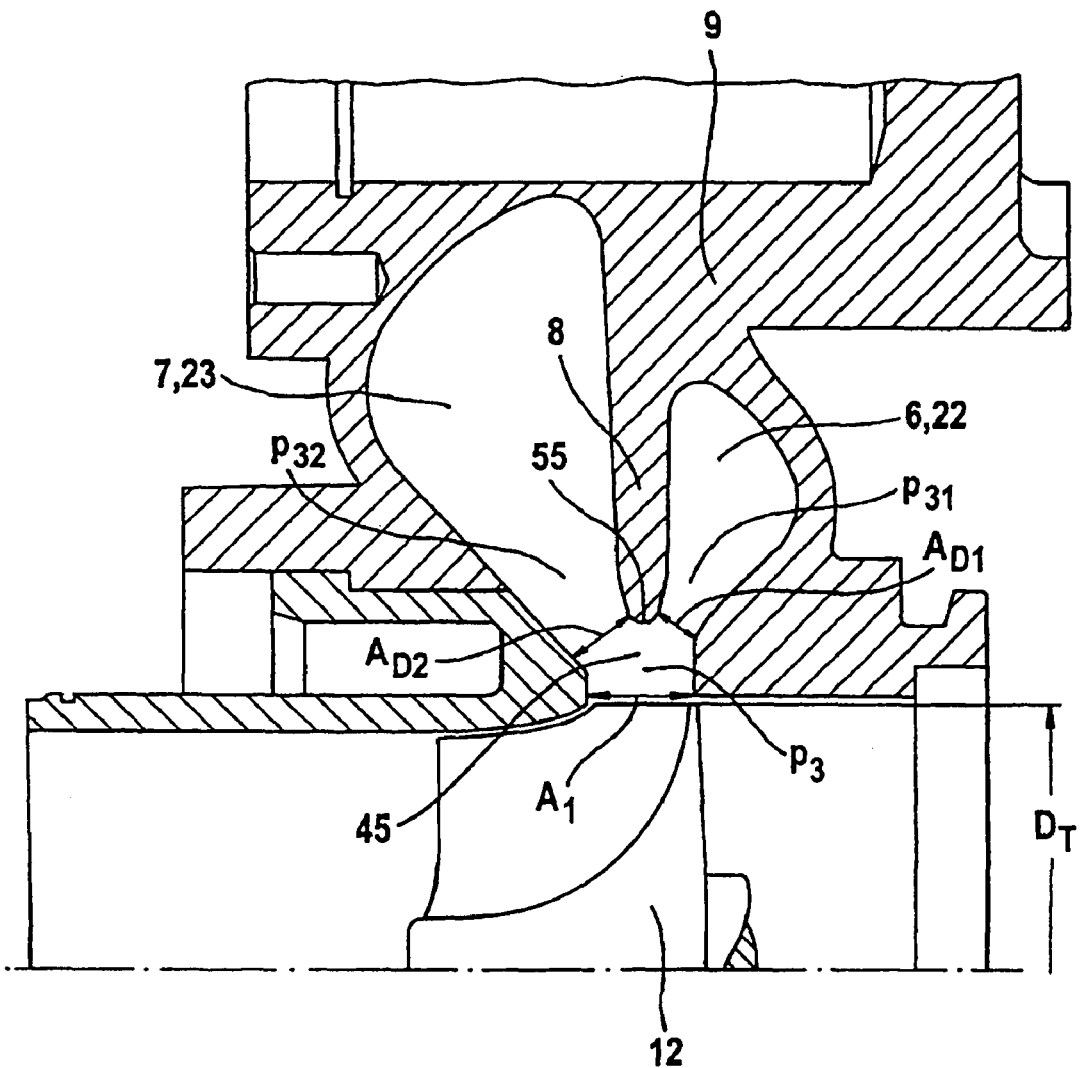
FIG. 2 is a longitudinal sectional view of a turbine of the exhaust gas turbocharger with two inlet passages.

The turbine 3 with one turbine wheel 12 is designed as an asymmetric two-inlet passage turbine and has two inlet passages 6 and 7 of different size, or two spiral channels 22 and 23 of different size in a turbine housing 9 shown in greater detail in FIG. 2. The two inlet passages 6 and 7 or the spiral channels 22 and 23 are separated from one another by a inlet passage partition wall 8 in the turbine housing 9 fixed to the housing. An exhaust gas line 37 is assigned to the turbine 3 downstream. The first inlet passage 6 is designed as the small inlet passage and the second inlet passage 7 as the large inlet passage.

The internal combustion engine 100 has, for example, two separate cylinder banks 10, 11 with an exhaust manifold 30, 31 being assigned to each cylinder bank 10, 11. Exhaust gas from the respective cylinder bank 10, 11 is directed into separate exhaust gas lines 35, 36 via the exhaust manifolds 30, 31. The exhaust gas lines 35 and 36 are in communication with the spiral channels 22 and 23 respectively.

An exhaust gas recirculation line 16 is assigned to the spiral channel 22 of the first inlet passage 6, whereby the exhaust gas recirculation line 16 has an exhaust gas recirculation cooler 15 in which the re-circulated exhaust gas can be cooled from a high exhaust gas temperature to a lower temperature. The exhaust gas recirculation line 16 connects the exhaust gas line 22 with the intake tract 2 downstream of an intercooler 14 installed downstream of the compressor 1. The exhaust gas recirculation line 16 should generally be assigned to the smaller inlet passage 6 of the two inlet passages 6, 7 in a flow-enhancing manner.

An adjustable valve arrangement 50 with a slide valve 48 that is preferably designed as a rotary disk valve is assigned to the spiral channels 22 and 23. The valve arrangement 50 has a first channel 51 and a second channel 52. The first channel 51 extends to the spiral channel 22 of the first inlet passage 6 and the second channel 52 extends to the spiral channel 23 of the second inlet passage 7. Furthermore, the valve arrangement 50 has a third channel 53 that ends downstream of the turbine in the exhaust gas channel 37.

The valve arrangement 50 can take three main positions. In a first main position according to FIG. 4, in the normal operating mode of the internal combustion engine 100, the channels 51 and 52 are closed. The exhaust gas flows through the spiral channels 22, 23 and the inlet passages 6, 7 undisturbed to the turbine wheel 12. In a second main position according to FIG. 6, the exhaust gas is diverted from the larger inlet passage 7 into the smaller inlet passage 6 in the engine braking mode of the internal combustion engine 100. This diversion controls the exhaust gas turbocharger speed or the delivery volume of the compressor 1. An increase in the delivery volume of the compressor 1 results in an increase in the braking power in the engine braking mode. In a third main position according to FIG. 8, the exhaust gas can be blown off in the engine braking mode, bypassing the turbine, in order to avoid a harmful excess exhaust gas turbocharger speed. In the three main positions it is fundamentally possible to control the exhaust gas volume of exhaust gas diverted or blown off from a maximum value to zero or from zero to a maximum value by turning the slide valve 48. An intermediate position is also possible in addition to these three main positions. For example, by turning the slide valve 48 further in the direction of the arrow 49 in FIG. 6, it is possible to blow off the exhaust gas as well as diverting it. It is also possible by turning the slide valve 48 further in the opposite direction to that of the arrow 49 in FIG. 8 to divert the exhaust gas as well as blowing it off. The exhaust gas is blown off through the third channel 53. Without this third channel 53, over-speeding of the exhaust gas turbocharger 20 could occur at high engine braking powers on engines with larger piston displacements and thus cause damage to the exhaust gas turbo-charger 20. The changeover from diversion to blow-off is also necessary with very high braking powers in the engine braking mode, as over-speeding of the exhaust gas turbo-charger 20 can also occur here. The blow-off that corresponds to a controlled deterioration in efficiency prevents over-speeding of the exhaust gas turbocharger 20.

Downstream of the exhaust gas lines 35, 36 and upstream of the spiral channels 22, 23 of the turbine 3, a shifting device 40 is assigned to the internal combustion engine 100 with which the exhaust gas supply to the spiral channels 22, 23 can be controlled. The shifting device 40 is provided up-stream of the valve arrangement 50. The shifting device 40 is in particular a shift valve that in one basic position connects the channels 35 and 22 and the channels 36 and 23. In one shift position of the shifting device 40, the channels 35 and 36 are connected only to the channel 22. The channel 23 is closed off. Corresponding switching of the shifting device 40 allows a choice between a pulse induction and a ram induction, whereby pulse induction predominates in the normal motoring mode of the internal combustion engine 100. If the operation of the internal combustion engine 100 is switched over to ram induction, the shifting device 40 is in its shift position and the exhaust gas is preferably supplied to the smaller of the two inlet passages 6, 7 by all the cylinders of the banks 10, 11. The shifting device 40 is thereby switched in such a way that the exhaust gas of the internal combustion engine 100 flows only through the smaller first inlet passage 6 of the two inlet passages 6, 7. The exhaust gas of the internal combustion engine 100 does not flow through the larger second inlet passage 7 of the two inlet passages 6, 7.

The shifting device 40 can be actuated electro-magnetically and is connected electrically to an open-loop and closed-loop control unit 18 of the internal combustion engine 100. The cylinder banks 10 and 11 are also connected electrically to the open-loop and closed-loop control unit 18 by means of sensors provided, so that thermodynamic parameters of the internal combustion engine 100 can be supplied to the open-loop and closed-loop control unit 18. The shifting device 40 is controlled as a function of these parameters. The valve arrangement 50 in particular is electro-magnetic and is also connected electrically to the control unit 18 so that the valve arrangement 50 can also be controlled by means of the open-loop and closed-loop control unit 18 as a function of the thermodynamic parameters of the internal combustion engine 100.

FIG. 2 shows a longitudinal section through the turbine 3 with the inlet passages 6, 7 and spiral channels 22, 23 of the internal combustion engine 100 in greater detail. The turbine housing 9 exhibits the two inlet passages 6, 7 and the spiral channels 22, 23. The inlet passage partition wall 8 of the turbine housing 9 separates the inlet passages 6, 7 and the spiral channels 22, 23. The inlet passages 6, 7 are merged in a transitional area 45 downstream of one end 55 of the inlet passage partition wall 8. In the transitional area 45, the exhaust gases of the two inlet passages 6, 7 mix before reaching the turbine wheel 12 of the turbine 3. The transitional area 45 has a neck cross section $A_1$ at the turbine wheel 12 that represents a free flow cross section $A_D$ to the turbine wheel 12 with a diameter $D_T$.

It is fundamental for the engine braking mode of the internal combustion engine 100 that the exhaust gas that drives the turbine wheel 12 is banked up. This ensures the highest possible speed of the turbine 3 and hence a high delivery volume of the compressor 1. The higher the banked pressure $p_3$ upline of the turbine wheel 12, the higher the delivery volume of the compressor 1 and the higher the power of the internal combustion engine 100 in engine braking mode. By contrast with the motoring mode of the internal combustion engine 100 for which the same applies, during braking mode of the internal combustion engine 100, a throttle or valve is opened in the cylinders of the cylinder banks 10, 11 at a certain angle of the crankshaft, generally near a top dead center position, so that the exhaust gas can escape from the cylinder and does not exert an expansion pressure on a piston in the cylinder.

It is fundamental for a backup of the exhaust gas that a backup pressure $p_3$ upstream of the turbine wheel 12 is larger, the smaller a free flow cross section $A_D$ to the turbine wheel 12 is. A smallest free flow cross section $A_{D,small}$ in the transitional area 45 is effective for the backup pressure $p_3$ upstream of the turbine wheel 12, as the largest backup pressure $p_3$ is produced at this smallest free flow cross section $A_{D,small}$.

Since the smaller inlet passage 6 of the two inlet passages 6, 7 normally also has a smaller ring nozzle cross section $A_{D1}$ than the larger inlet passage 7 of the two inlet passages 6, 7, the banking of the exhaust gas at the turbine is achieved in such a manner that the exhaust gas flows from the larger inlet passage 7 with a normally larger annular nozzle cross section $A_{D2}$ of the two inlet passages 6, 7 into the smaller of the two inlet passages 6, 7 by means of the valve arrangement 50.

For the maximum braking power it is thus only relevant whether the smallest free flow cross section $A_{D,small}$ is formed by the ring nozzle cross section $A_{D1}$ of the smaller inlet passage 6 of the two inlet passages 6, 7 or by the neck cross section $A_1$. If the ring nozzle cross section $A_{D1}$ is smaller than the neck cross section $A_1$, the ring nozzle cross section $A_{D1}$ is relevant for the maximum braking power. If the neck cross section $A_1$ is smaller than the ring nozzle cross section $A_{D1}$, the neck cross section $A_1$ is relevant for the maximum braking power.

As shown in FIG. 2, the first inlet passage 6 has the smaller flow cross section $A_{D1}$. The second inlet passage 7 has the larger flow cross section $A_{D2}$. Consequently, the inlet passage 6 can be referred to as the smaller inlet passage and the inlet passage 7 as the larger inlet passage.

In order to break down the size relationships between the small inlet passage 6 and the large inlet passage 7, an asymmetry factor $F_{Asym}$ can be determined as a function of a total piston displacement $V_H$ of the internal combustion engine 100 according to an equation $$F_{Asym} = \frac{\phi_{31,S}}{\phi_{32,S}}$$

that follows the equation $$F_{Asym} \leq \left(\frac{1}{V_H}\right)^{0.15}.$$

The total piston displacement $V_H$ of the internal combustion engine 100 is formed from the difference between the maximum and minimum piston displacements of the cylinders. $\phi_{31,s}$ corresponds here to a turbine throughput parameter through the small inlet passage 6 in the range of a choke line S of the turbine 3 and $\phi_{32,s}$ corresponds to a turbine throughput parameter through the large inlet passage 7 in the range of the choke line S of the turbine 3. The turbine throughput parameters $\phi_{31,s}$ and $\phi_{32,s}$ can be calculated according to the equations for the turbine throughput parameters $\dot{m}_{31,s}$ and $\dot{m}_{32,s}$ as a function of the exhaust gas mass flows $m_{31,s}$ and $m_{32,s}$ through the inlet passages 6 and 7 respectively, the exhaust gas temperatures $T_{31,s}$ and $T_{32,s}$ of the exhaust gas in the inlet passages 6 and 7 respectively, and the exhaust gas pressures $p_{31,s}$ and $p_{32,s}$ of the exhaust gas in the inlet passages 6 and 7 respectively as $$\phi_{31,S} = \dot{m}_{31,S}\sqrt{T_{31,S}} \cdot \frac{1}{p_{31,S}}$$

$$\phi_{32,S} = \dot{m}_{32,S}\sqrt{T_{32,S}} \cdot \frac{1}{p_{32,S}}.$$

A total turbine throughput parameter $\phi_{tot,2}$ is obtained from the addition of the turbine throughput parameter $\phi_{31,s}$ and the turbine throughput parameter $\phi_{32,s}$ and can be determined empirically or analytically from the total piston displacement $V_H$ of the internal combustion engine 100. This permits exact dimensioning and design of the inlet passages 6, 7.

Figure 3:
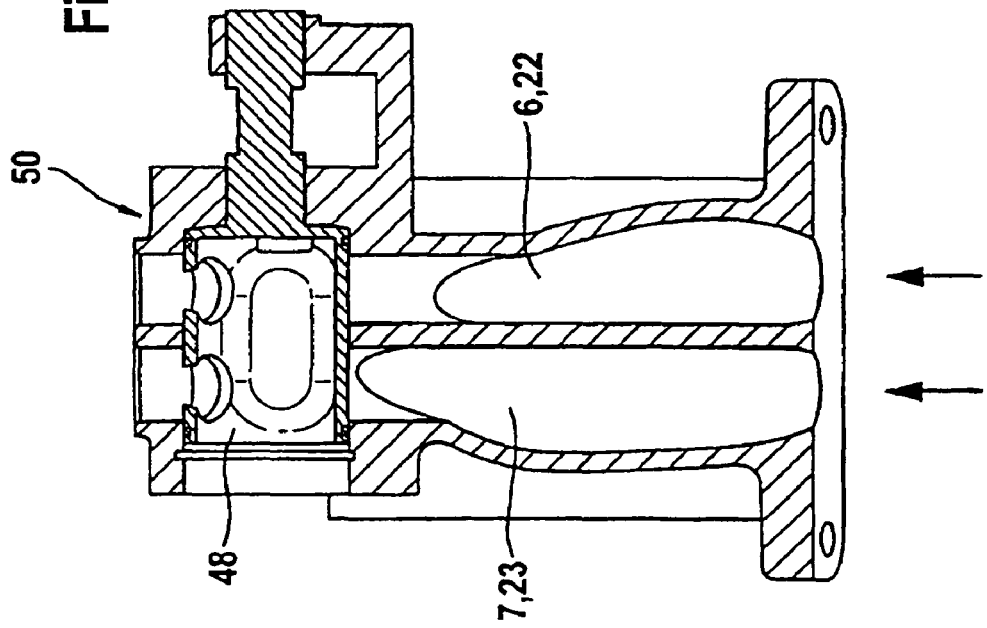
FIG. 3 shows a cross section through the turbine with two inlet passages and a valve arrangement according to FIG. 2 in a valve position in which the exhaust gas flows through both inlet passages.

FIG. 3 shows a cross section through the inlet passages 6, 7 and the valve arrangement 50 of the turbine corresponding to FIG. 2. The valve arrangement 50 is in a closed state in which no exhaust gas can flow from the inlet passage 7 into the inlet passage 6 or from the inlet passage 6 into the inlet passage 7. This corresponds to the normal operating mode of the internal combustion engine 100 without the use of the exhaust gas turbocharger 20 as an engine brake.

Figure 4:
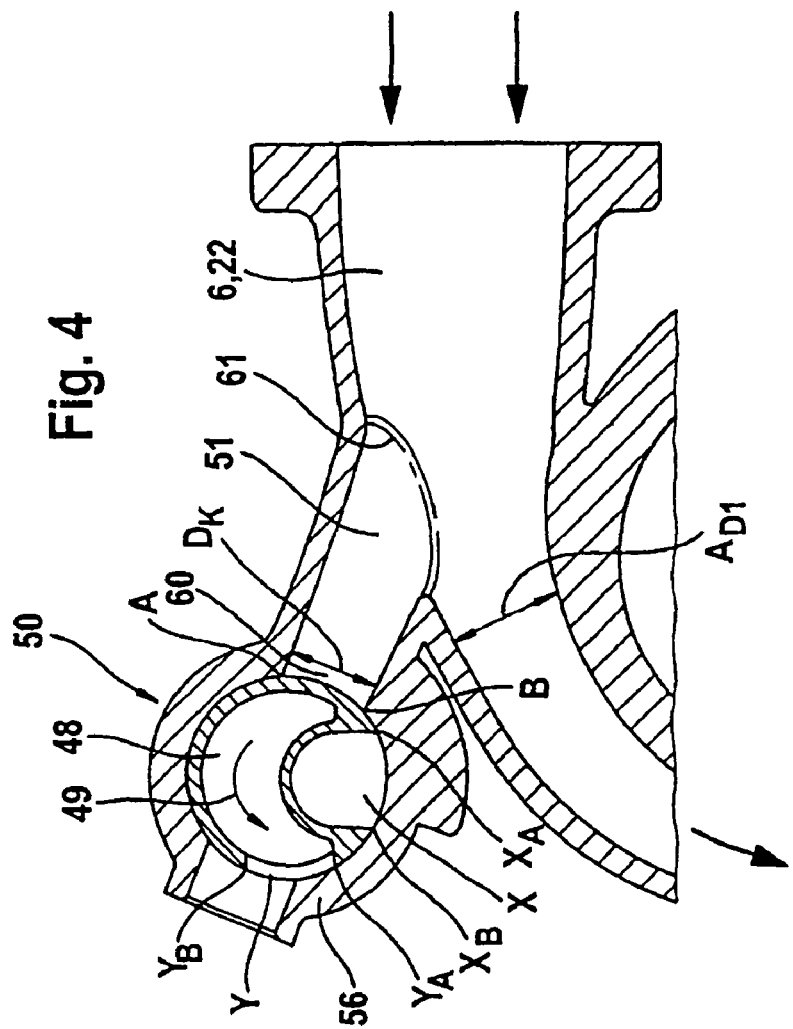
FIG. 4 shows a further cross section through the valve arrangement according to FIG. 3.

FIG. 4 shows a further cross section of the valve arrangement 50 and of the channel 51 of the first inlet passage 6 corresponding to FIG. 3. The channel 51 branches off from the first inlet passage 6 at a branch 61 in the turbine housing 9. The branch 61 is located upstream of the turbine wheel 12, for example not far from the annular nozzle cross section $A_{D1}$. At one channel end 60 of the channel 51 with a channel diameter $D_K$, the valve arrangement 50 is connected to a valve arrangement housing 56. The valve arrangement housing 56 can—as illustrated—be part of the turbine housing 9. It is also possible to design the valve arrangement housing 56 as a separate housing.

The valve arrangement 50 is designed as a rotary disk valve with the slide valve 48. The slide valve 48 is accommodated in the valve arrangement housing 56 so that it can rotate. Around its circumference, the slide valve 48 has both a diversion opening X with an opening perimeter or opening edge $X_A$ and a closing perimeter or closing edge $X_B$ and a blow-off opening Y with an opening perimeter or opening edge $Y_A$ and a closing perimeter or closing edge $Y_B$. Via the diversion opening X, exhaust gas is diverted from the channel 52 (not illustrated in more detail here) of the second inlet passage 7 (not illustrated in more detail here) into the channel 51 of the first inlet passage 6. Exhaust gas is guided via the blow-off opening Y out of the first inlet passage 6 via the channel 51 into the third channel 53 (not illustrated in more detail here) to bypass the turbine 3. In the position of the slide valve 48 shown, the channel is closed, as neither the diversion opening X nor the blow-off opening Y lie over the channel end 60 or are aligned with the channel end 60.

The channel end 60 has two prominent points B and A that as soon as they are passed by one of the edges $X_A$, $X_B$ of the diversion opening X or by one of the edges $Y_A$, $Y_B$ of the diversion opening Y, begin to open or close the channel 51.

If the slide valve 48 in its position according to FIG. 4 is turned, for example, in the direction of the arrow 49, the opening edge $X_A$ of the diversion opening X reaches the first prominent point B of the channel 51 and as it is turned further in the direction of the arrow 49 uncovers part of the channel 51 so that a variable opening cross section $dA_{Ab}$ (not illustrated in more detail here) is formed through which exhaust gas can flow from the channel 51 into the valve arrangement 50. In the position of the slide valve shown, the value of the variable opening cross section $dA_{Ab}$ is still zero.

FIG. 5 shows a cross section through the inlet passages 6, 7 and the valve arrangement 50 of the turbine corresponding to FIG. 2. The valve arrangement 50 is in an open state in which the exhaust gas can flow from the inlet passage 7 into the inlet passage 6 or from the inlet passage 6 into the inlet passage 7. The slide valve 48 is in its diversion position. The exhaust gas passes from the larger inlet passage 7 into the smaller inlet passage 6 as indicated by the arrows 57 shown in FIG. 5.

FIG. 6 shows a further cross section of the valve arrangement 50 and the channel 51 corresponding to FIG. 5. The opening edge $X_A$ of the diversion opening X has reached the second prominent point A of the channel end 60, and the closing edge $X_B$ has reached the first prominent point B of the channel end 60, so that the diversion opening X completely uncovers the diameter $D_K$ of the channel 51. In this position of the valve arrangement 50, the variable opening cross section $dA_{Ab}$ represents a maximum variable opening cross section $dA_{Ab,max}$ of the slide valve 48 of the valve arrangement 50. The exhaust gas passes from the channel 52 via the diversion opening X into the channel 51.

If the valve arrangement 50 is turned further in the direction of the arrow 49, the opening edge $X_A$ of the diversion opening X moves in the direction of the arrow 49 over the second prominent point A of the channel end 60 and thereby reduces the variable opening cross section $dA_{Ab}$ of the diversion opening X until the opening edge $Y_A$ of the blow-off opening Y passes the first prominent point B of the channel end 60. The variable opening cross section $dA_{Ab}$ then partially uncovers both the diversion opening X and the blow-off opening Y in such a way that exhaust gas is both diverted and blown off in this intermediate position.

Figure 7:
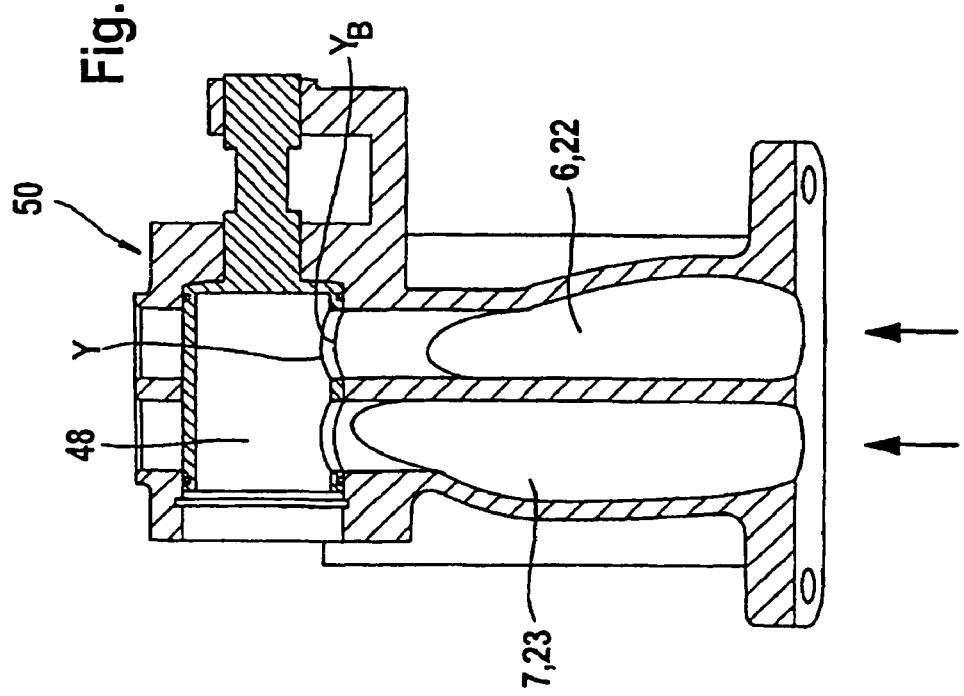
FIG. 7 shows a cross section through the turbine with two inlet passages and through the valve arrangement of the turbine according to FIG. 2 in a valve position in which a blow-off of exhaust gas into an exhaust channel takes place.

FIG. 7 shows a cross section through the inlet passages 6, 7 and the valve arrangement 50 of the turbine 3 corresponding to FIG. 2. The valve arrangement 50 is in a position in which a blow-off takes place in such a way that no exhaust gas can flow from the larger inlet passage 7 into the smaller inlet passage 6 or vice versa. The exhaust gas flows via the blow-off opening Y into the third channel 53 (see FIG. 1) downstream of the turbine 3 further into the exhaust gas channel 37.

Figure 8:
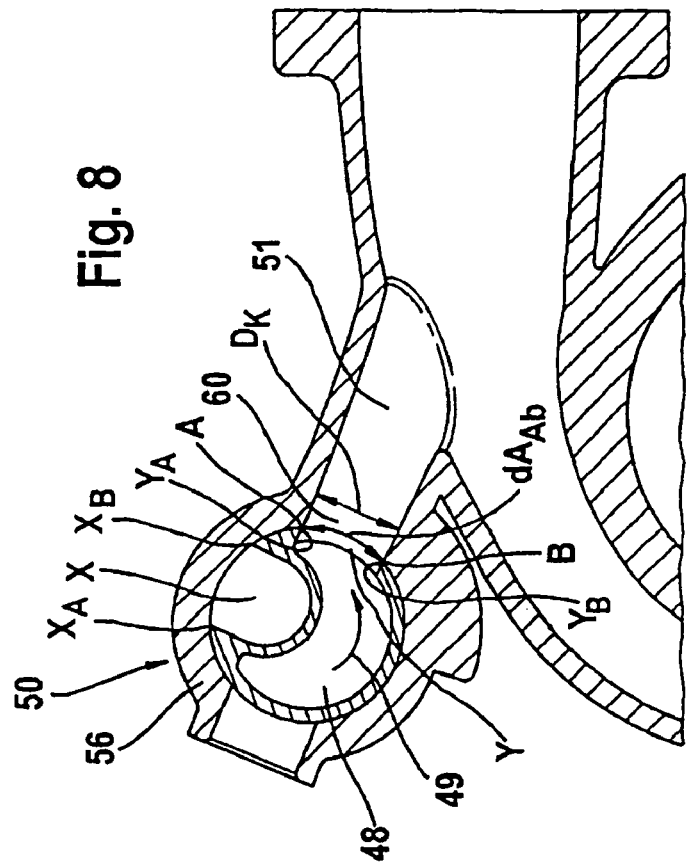
FIG. 8 shows a further cross section through the valve arrangement according to FIG. 7.

FIG. 8 shows a further cross section of the valve arrangement 50 and the channel 51 corresponding to FIG. 7. The opening edge $Y_A$ of the blow-off opening Y has reached the second prominent point A of the channel end 60, and the closing edge $Y_E$, of the blow-off opening Y has reached the first prominent point B of the channel end 60, so that the blow-off opening Y completely uncovers the channel 51 in such a way that exhaust gas can flow from the channel 51 via the blow-off opening Y into the third channel 53 (not illustrated in more detail here) (see FIG. 1). In this position of the valve arrangement 50, the two inlet passages 5, 6 are closed and the exhaust gas is blown off completely into the third channel 53.

The present invention defines design specifications between internal combustion engine, turbocharger and achievable braking power with the aim of achieving the lowest possible thermal load of the internal combustion engine 100 and of the exhaust gas turbocharger 20.

The total piston displacement $V_H$ of the internal combustion engine 100, the diameter $D_T$ of the turbine wheel 12 and the free flow cross section $A_D$ in the exhaust gas tract to the turbine 3 are of particular importance here. The free flow cross section $A_D$ is made up here of the fixed smallest flow cross section $A_{D,small}$ and the maximum variable opening cross section $dA_{Ab,max}$.

The relationship that exists according to the invention and that results in an internal combustion engine with exhaust gas turbocharger in which the high braking powers for the braking mode result in relatively low thermal loads is as follows:

$$TBF_{Asym} = (A_{D,small} + dA_{Ab,max}) \cdot \frac{D_T}{V_H}$$

where $TBF_{Asym}$ represents a turbocharger braking factor that is smaller than 0.005 and preferably lies between 0.001 and 0.003, in particular at 0.002. If the internal combustion engine 100 has a total piston displacement of more than ten liters, a blow-off is to be recommended in order to avoid an overspeeding of the turbocharger rotor of the exhaust gas turbocharger 20. The blow-off applies also for high braking powers that have a value for the turbocharger braking factor $TBF_{Asym}$ that is smaller than 0.003.

According to the design embodiment of the turbine 3, the fixed smallest flow cross section $A_{D,small}$ is determined either by the smallest annular nozzle cross section $A_{D1}$ or by the neck cross section $A_1$. If the smallest annular nozzle cross section $A_{D1}$ is larger than the neck cross section $A_1$, the neck cross section $A_1$ represents the fixed smallest flow cross section $A_{D,small}$. If the neck cross section $A_1$ is larger than the smallest annular nozzle cross section $A_{D1}$, then the smallest annular nozzle cross section $A_{D1}$ represents the fixed smallest flow cross section $A_{D,small}$.

Since the larger inlet passage 7 is used for the diversion, in other words exhaust gas is diverted from the larger inlet passage 7 into the inlet passage 6, it is physically not expedient to select the maximum variable opening cross section $dA_{Ab,max}$ larger than the annular nozzle cross section $A_{D2}$ of the larger inlet passage 7. An increase in the maximum variable opening cross section $dA_{Ab,max}$ would not have a more positive effect on the flow conditions.

The flow cross section to the turbine wheel 12 uncovered at maximum braking power comprises, in accordance with the preceding explanations, the fixed flow cross section $A_{D,small}$ and the variable opening cross section $dA_{Ab,max}$. A ratio of the maximum variable opening cross section $dA_{Ab,max}$ and the fixed flow cross section $A_{D,small}$, referred to as the proportional number $V_A$, is preferably larger than 0.2. The proportional number $V_A$ lies in particular in the range between 0.2 and 1, whereby this proportional number $V_A$ should be selected higher, the higher the engine braking power is to be at low engine speeds.

Figure 9:
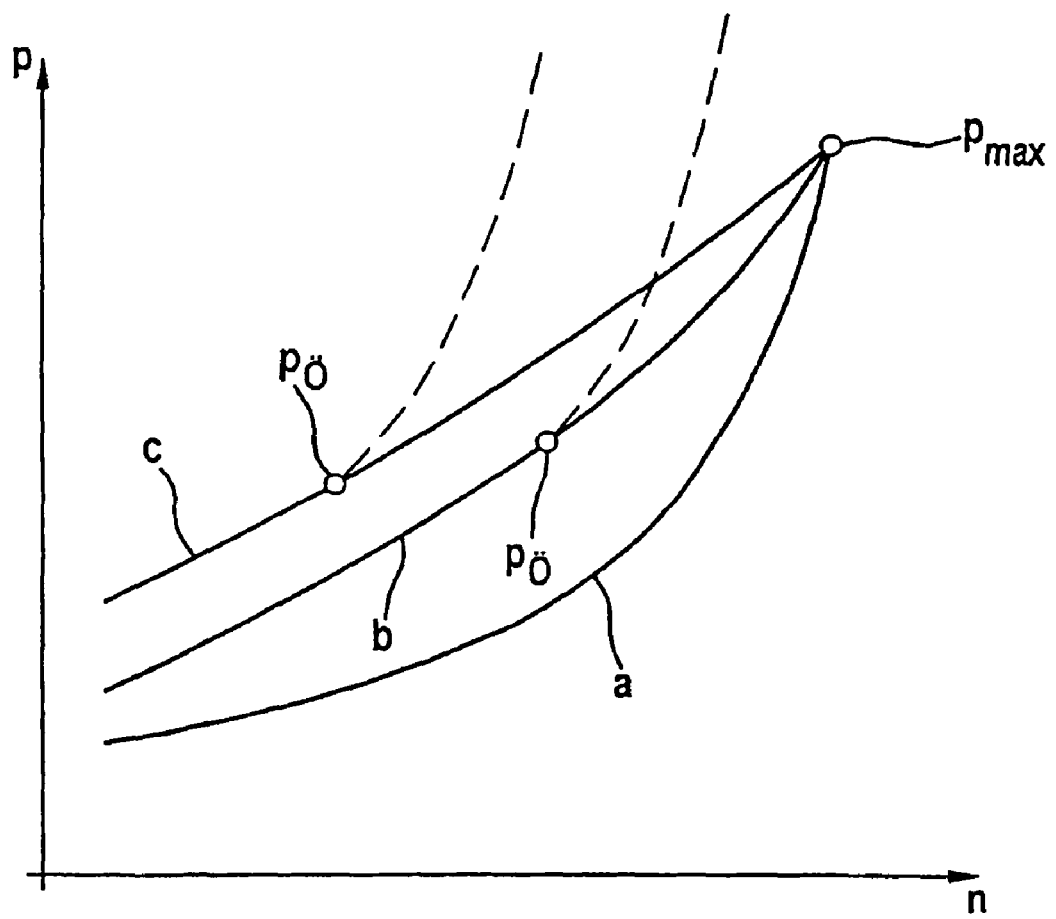
FIG. 9 shows a schematic diagram in which the fundamental curve of the braking power P is plotted against the engine speed n with different ratios of variable flow cross section and with additionally uncovered flow cross section at maximum braking power.

FIG. 9 illustrates this in a schematized diagram in which the braking power P is plotted against the engine speed n. Curve a describes the conditions with respect to the internal combustion engine 100 comprising the exhaust gas turbocharger 20 in which the size of the flow cross section $A_D$ in the exhaust gas tract to the turbine 3 is held constant over the whole engine speed range, in other words there is no variable opening cross section $dA_{Ab}$. Curve b intersects curve a at the design point $P_{max}$ at maximum braking power, but lies above curve a and illustrates an internal combustion engine design where a higher braking power is already desired in the lower engine speed range and in which, by comparison with an analogous engine configuration and the same exhaust gas volumes, there therefore has to be a smaller variable opening cross section $dA_{Ab}$ in addition to the fixed smallest flow cross section $A_{D,small}$ in the exhaust gas tract to the turbine 3 in the lower engine speed range. This design corresponds to an increase in the variable opening cross section $dA_{Ab}$ for the upper engine speed range, as otherwise the maximum braking power would be reached at a lower engine speed level. This means that the variable opening cross section $dA_{Ab}$ decreases with falling engine speed. The start of the opening of the valve arrangement 50 is indicated at $P_5$; without activation of the variable opening cross section $dA_{Ab}$, the curve starting from $P_ö$ would be steeper, as indicated by the dashed line.

Curve c represents a further variant with even higher braking power in the lower engine speed range, and with the same basic design of the engine the variable opening cross section $dA_{Ab}$ for the upper engine speed range has to be larger than in case b if the maximum braking power $P_{max}$ is to be achieved at the same engine speed. By analogy with curve b, $P_ö$ is here the activation point of the variable opening cross section $dA_{Ab}$.

The variable opening cross section $dA_{Ab}$ is therefore activated with increasing variable proportion of the whole free flow cross section $A_D$ or with higher braking power in the lower engine speed range, preferably at low engine speeds in each case, in order to ensure a gradual increase in the braking power over the engine speed.

As far as the internal combustion engine 100 comprising the exhaust gas turbocharger 20 is concerned, the maximum braking power is expediently reached in an engine speed range that lies above the range of the rated engine speed (the engine speed at maximum power) of the internal combustion engine 100. If the rated engine speed is 1800 revolutions per minute, the engine speed at maximum braking power can lie, for example, in the range of 2300 revolutions per minute, whereby this represents a preferred embodiment. The upper engine speed range in which an additional, variable discharge cross section is uncovered with increasing engine speed starts expediently at roughly ⅔ to ¾ of the engine speed at maximum braking power, whereby the size of the variable opening cross section $dA_{Ab}$ preferably increases in line with the engine speed until the maximum braking power is reached, this representing the reference point for the design of the system for maximum braking power with the lowest possible thermal load explained above.

What is claimed is:

1. An internal combustion engine comprising an exhaust gas turbocharger, said engine having at least one variable-volume combustion chamber, and an exhaust gas tract (4) extending from the combustion chamber, said combustion chamber having a total piston displacement volume $V_{11}$ that can be determined by the difference between a minimum and a maximum combustion chamber volume, said exhaust gas turbocharger (20) including a turbine (3) arranged in the exhaust gas tract (4) of the internal combustion engine (100) with a turbine wheel (12) having a diameter $D_T$ and with at least two inlet passages (6, 7) and a neck cross section $A_I$ in which the inlet passages (6, 7) end in at least two annular nozzles with flow cross-sections of different size, and through which exhaust gas can be supplied to the turbine wheel (12) via the inlet passages (6, 7), and a valve arrangement (50) with a flow cross-section $dA_{Ab}$, which is adjustable between a minimum opening cross-section $dA_{Ab,min}$ and a maximum opening cross-section $dA_{Ab,max}$ being provided in the exhaust gas tract (4) to the turbine (3), for diverting exhaust gas from one inlet passage (6, 7) into the other inlet passage (7, 6) or blowing exhaust gas off past the turbine wheel (12), wherein based on an engine braking mode at maximum braking power of the internal combustion engine 100, the diameter $D_T$ of the turbine wheel 12, the piston displacement $V_H$ of the internal combustion engine 100, a smallest flow cross section $A_{D,small}$ to the turbine wheel 12, and the maximum opening cross section $dA_{Ab,max}$ of a diverting opening (X) of the valve arrangement (50) which determines a turbocharger braking factor $TBF_{asym}$ are related to one another as follows:

$$TBF_{Asym} = (A_{D,small} + dA_{Ab,max}) \cdot \frac{D_T}{V_H}$$

where the turbocharger braking factor $TBF_{asym}$ is smaller than 0.005, and the smallest flow cross-section $A_{D,small}$ at maximum braking power corresponds to:

$A_{D,small} = A_{D,1}$ if the neck cross-section $A_I$ being is larger than the smallest annular nozzle cross section $A_{D,1}$ or the smallest annular nozzle flow cross-section $A_{D,small}$ at maximum braking power corresponds to:

$A_{D,small} = A_I$ if the neck flow cross-section $A_1$ is smaller than the smallest annular nozzle cross section $A_{D,I}$.

2. The internal combustion engine at claimed in claim 1, wherein the ratio $V_A$ of the maximum variable opening cross section $dA_{Ab,max}$ to the smallest flow cross section $A_{D,small}$ at maximum braking power corresponds to:

$$V_A = \frac{dA_{Ab,max}}{A_{D,small}} > 0.2.$$

3. The internal combustion engine as claimed in claim 2, wherein the value of the opening cross section $dA_{Ab,max}$ of the diversion opening (X) of the valve arrangement (50) at maximum braking power is the upper limit value that the opening cross section $dA_{Ab}$ of the diversion opening (X) of the valve arrangement (50) can assume.

4. The internal combustion engine as claimed in claim 3, wherein the value of the maximum opening cross-section $dA_{Ab,max}$ of the diversion opening (X) of the valve arrangement (50) does not exceed the value of a largest annular nozzle cross-section.

5. The internal combustion engine as claimed in claim 4, wherein the opening cross section $dA_{Ab}$ of the diversion opening (X) of the valve arrangement (50) is variable according to the engine speed.

6. The internal combustion engine as claimed in claim 5, wherein the opening cross section $dA_{Ab}$ of the diversion opening (X) of the valve arrangement (50) is reduced with falling engine speed.

7. The internal combustion engine as claimed in claim 6, wherein the range of the opening cross-section $dA_{Ab}$ of the diversion opening (x) assigned to an. upper range of an engine speed band extends at least up to the engine speed at maximum braking power.

8. The internal combustion engine as claimed in claim 7, wherein the maximum braking power is at an engine speed that is higher than the rated. engine speed of the internal combustion engine (100).

9. The internal combustion. engine as claimed in claim 8, wherein the engine speed range in which the opening cross section $dA_{Ab}$ of the diversion opening (X) of the valve arrangement (50) is uncovered begins at roughly ⅔ to ¾ of the engine speed at maximum braking power.

10. The internal combustion engine as claimed in claim 9, wherein the maximum braking power lies at an engine speed that is roughly ¼ to ⅓ higher than the rated engine speed of the internal combustion engine (100).

11. An internal combustion engine comprising an exhaust gas turbocharger, said engine having at least one variable-volume combustion chamber, and an exhaust gas tract (4)

extending from the combustion chamber, said combustion chamber having a total piston displacement volume $V_H$ that can be determined by the difference between a minimum and a maximum combustion chamber volume, said exhaust gas turbocharger (20) including a turbine (3) arranged in the exhaust as tract (4) of the internal combustion engine (100) with a turbine wheel (12) having a diameter $D_T$ and with at least two inlet passages (6, 7) and a neck cross section $A_1$ in which the inlet passages (6, 7) end in at least two annular nozzles with flow cross-sections of different size, and through which exhaust gas can be supplied to the turbine wheel (12) via the inlet passages (6, 7), and a valve arrangement (50) with a flow cross-section $dA_{Ab}$, which is adjustable between a minimum opening cross-section $dA_{Ab,min}$ and a maximum opening cross-section $dA_{Ab,max}$ being provided in the exhaust gas tract (4) to the turbine (3), for diverting exhaust gas from one inlet passage (6, 7) into the other inlet passage (7, 6) or blowing exhaust gas off past the turbine wheel (12), wherein based on an engine braking mode at maximum braking power of the internal combustion engine (100), the diameter $D_T$ of the turbine wheel (12),
the piston displacement $V_H$ of the internal combustion engine (100),
a smallest flow cross section $A_{D,small}$ to the turbine wheel (12), and
the maximum opening cross section $dA_{Ab,max}$ of a diverting opening (X) of the valve arrangement (50) which determines a turbocharger braking factor $TBF_{asym}$ are related to one another as follows:

$$TBF_{Asym} = (A_{D,small} + dA_{Ab,max}) \cdot \frac{D_T}{V_H}$$

where the turbocharger braking factor $TBF_{asym}$ is smaller than 0.005, and the smallest flow cross-section $A_{D,small}$ at maximum braking power corresponds to:

$A_{D,small} = A_{D,1}$ if the neck cross-section $A_1$ is larger than the smallest annular nozzle cross section $A_{D,1}$ or the smallest annular nozzle flow cross-section $A_{D,small}$ at maximum braking power corresponds to:

$A_{D,small} = A_1$ if the neck flow cross-section $A_1$ is smaller than the smallest annular nozzle cross section $A_{D,1}$,
wherein an asymmetry factor $F_{Asym}$ characterizing the ratio of sizes of the inlet passages (6, 7) of the turbine (3) as a function of the piston displacement $V_{H}$ of the internal combustion engine (100) follows the equation $$F_{Asym} \le \left(\frac{1}{V_H}\right)^{0.15}$$

the asymmetry factor $F_{Asym}$ being defined according to the equation $$F_{Asym} = \frac{\phi_{31,S}}{\phi_{32,S}}$$

and $\phi_{31,s}$ and $\phi_{32,s}$ defining turbine throughput parameters in the range of the choke line S of the turbine (3) that can be calculated from the equation $$\phi_{31,S} = \dot{m}_{31,S} \sqrt{T_{31,S}} \cdot \frac{1}{p_{31,S}}$$

$$\phi_{32,S} = \dot{m}_{32,S} \sqrt{T_{32,S}} \cdot \frac{1}{p_{32,S}}$$

wherein $\dot{m}_{31,s}$ and $\dot{m}_{32,s}$ refer to the exhaust gas mass flow through the first and second inlet passages (6, 7) respectively in the range of the choke line S of the turbine (3), $T_{31,s}$, $T_{32,s}$ to the exhaust gas temperatures in the first and second inlet passages (6, 7) respectively in the range of the choke line S of the turbine (3), and $p^{31,G}$, $p_{32,s}$ to the exhaust gas pressures in the first and second inlet passages (6, 7) respectively in the range of the choke line S of the turbine (3).

12. The internal combustion engine as claimed in claim 1, wherein the valve arrangement (50) is designed as a rotary disk valve.

13. The internal combustion engine as claimed in claim 12, wherein the rotary disk valve (50) includes, in addition to a diversion opening (X), a blow-off opening (Y).

14. The internal combustion engine as claimed in claim 13, wherein the blow-off opening (Y) is formed as a narrow slot on the slide valve (48).

15. The internal combustion engine as claimed in claim 1, wherein, with at turbocharger braking factors $TBF_{Asym}$ smaller than 0.003, the valve arrangement (50) is in a blowoff position.

16. The internal combustion engine as claimed in claim 1, wherein, with turbocharger braking factors $TBF_{Asym}$ at least equal to 0.003, the valve arrangement (50) is in a diversion position.

* * * * *